(12) United States Patent
Hata et al.

(10) Patent No.: US 6,424,077 B1
(45) Date of Patent: Jul. 23, 2002

(54) MANIPULATOR

(75) Inventors: Yoshiaki Hata, Ashiya; Hideaki Nakanishi, Osaka, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/544,876

(22) Filed: Apr. 7, 2000

(30) Foreign Application Priority Data

Apr. 15, 1999 (JP) ............................................ 11-108303

(51) Int. Cl.⁷ ........................... H01L 41/04; H01L 41/08
(52) U.S. Cl. .............. 310/328; 310/323.21; 310/323.17
(58) Field of Search ........................... 310/328, 323.17, 310/323.21

(56) References Cited

U.S. PATENT DOCUMENTS

| | | | | |
|---|---|---|---|---|
| 3,575,301 A | * | 4/1971 | Panissidi .................... 214/147 |
| 4,048,687 A | * | 9/1977 | Kato et al. ................. 10/155 R |
| 4,445,273 A | * | 5/1984 | Van Brussel et al. ......... 29/714 |
| 4,453,085 A | * | 6/1984 | Pryor ..................... 250/203 R |
| 4,466,770 A | * | 8/1984 | Peroutky .................... 414/751 |
| 4,714,400 A | * | 12/1987 | Barnett et al. .............. 414/751 |
| 4,872,257 A | * | 10/1989 | Wakamori et al. ............ 29/701 |
| 4,882,527 A | * | 11/1989 | Yakuyama et al. .... 318/568.13 |
| 4,894,103 A | * | 1/1990 | Bailey ....................... 156/111 |
| 4,961,267 A | * | 10/1990 | Herzog ........................ 33/503 |
| 5,243,266 A | * | 9/1993 | Kasagami et al. ........ 318/568.1 |
| 5,847,488 A | * | 12/1998 | Yoshida et al. ............. 310/328 |
| 6,234,003 B1 | * | 5/2001 | Nakajima et al. ................ 73/9 |
| 6,264,419 B1 | * | 7/2001 | Schinzel .................. 414/751.1 |
| 6,265,839 B1 | * | 7/2001 | Layton ........................ 318/115 |

FOREIGN PATENT DOCUMENTS

| | | | |
|---|---|---|---|
| JP | 7-091947 A | 4/1995 | ........... G01B/21/00 |
| JP | 10-138184 A | 5/1998 | ............ B25J/11/00 |

* cited by examiner

Primary Examiner—Thomas Dougherty
(74) Attorney, Agent, or Firm—Sidley Austin Brown & Wood LLP

(57) ABSTRACT

A plurality of linear actuators (10, 20, 30) connected in sequence orthogonally to one another constitute rectilinear movement means having a plurality of degrees of freedom in rectilinear movement. Further, a rotary actuator (40) has one end connected to the linear actuator (30) on the last stage and the other end connected to a base side of an end effector (50) and works as attitude change means for changing an attitude of the end effector (50). When the rotary actuator (40) changes the attitude of the end effector (50), the linear actuators (10, 20, 30) are driven to offset a positional movement of an object occurring with the attitude change. This makes it possible to offset the positional movement of the object occurring with the rotary operation with a relatively simple constitution, and further the actuators can be constituted of the minimum elements, thereby providing a downsized micromanipulator.

23 Claims, 9 Drawing Sheets

F/G. 1

F I G. 10
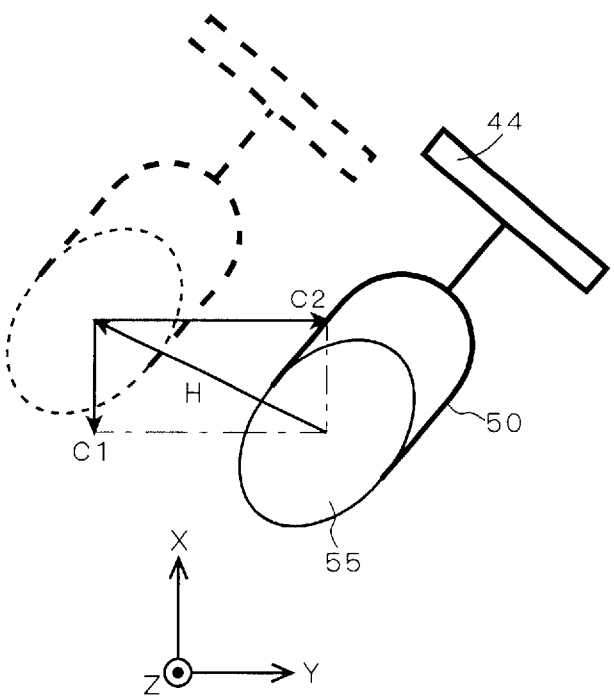
F I G. 11
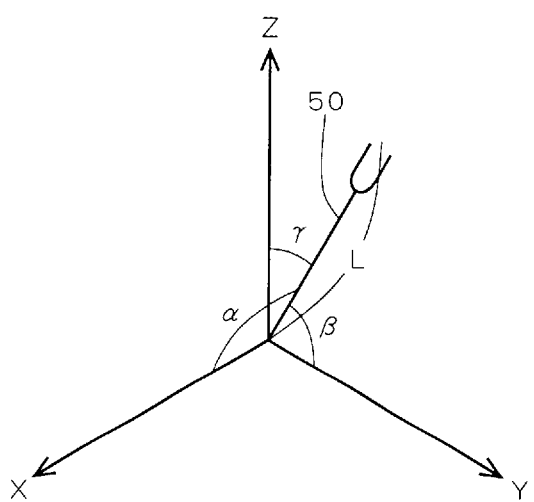

MANIPULATOR

This application is based on application No. 11-108303 filed in Japan, the content of which is hereby incorporated by reference.

BACKGROUND OF THE INVENTION

1. Field of the Invention

The present invention relates to a micromanipulator used for manipulating a microscopic object in an arbitrary state in microscopic manipulation of cells, fabrication of fine parts and the like.

2. Description of the Background Art

In technical fields such as microscopic manipulation of cells, various micromanipulators have been conventionally used to perform a microscopic manipulation on a cell level under a microscope.

The background-art micromanipulators include a three-dimensional joy stick type hydraulic manipulator having a driving mechanism consisting of two units, i.e., an operation side and a driving side, where an operation of the operation side is hydraulically transported to the driving side to manipulate a microscopic object, an ultrasonic linear motor system manipulator using three ultrasonic linear motors and combining them in three-axis directions, i.e., X-, Y- and Z-axis directions, to achieve three degrees of freedom in rectilinear movement, and the like.

Further, in the micromanipulator with multi degrees of freedom, it is desirable to change only an attitude of the microscopic object without moving its position in performing rotary operations such as roll, pitch and yaw. From this viewpoint, as disclosed in Japanese Patent Application Laid Open Gazette 10-138184, there is a possible constitution where a rotary actuator performs the rotary movement to control the attitude of an end effector and a rectilinear movement actuator performs a rectilinear movement (translational movement) for positioning it, and a movement of any actuator does not interfere with that of other actuators.

The background-art micromanipulator, however, has a large-sized actuators, though objects to be manipulated thereby are microscopic and further has a large-sized power transport mechanism such as hydraulic mechanism using oil pressure or water pressure and a link mechanism, and therefore the manipulator itself is upsized, to cause inconvenience for actual use.

Furthermore, though the constitution of a manipulator shown in the above Laid Open Gazette makes it possible to offset a positional movement of the end effector without complicate control, the manipulator is upsized as the mechanism portion including the link mechanism is complicated in constitution even in this case, and it is disadvantageously difficult to apply this manipulator to an operation and the like in a very small working space such as under a microscope and the like.

Upsizing of the background-art manipulator is caused by the constitution in which functional means necessary for driving mechanisms of the manipulator are made of different members. For example, in most of the rectilinear movement actuators, driving means for generating a driving power, a linear guide for controlling the movement into a rectilinear direction, a driving transport mechanism for transporting a power by the driving means, a movement member movable in a rectilinear direction and the like are separately constituted, and in some manipulators, stages and the like for mounting the rectilinear movement actuators in other directions are provided. Therefore, it requires a considerably large size to assemble these separate members.

SUMMARY OF THE INVENTION

The present invention is directed to a manipulator.

According to a first aspect of the present invention, the manipulator comprises: a holding unit for holding an object; a rotary member for rotating the holding unit about a predetermined axis in a predetermined plane; and at least one parallel movement member for parallelly moving the holding unit in a direction opposite to a direction in which the center of the object is moved by rotation of the holding unit.

Therefore, it is possible to offset a positional movement of the object occurring with the operation of the rotary member and each member is constituted of the minimum elements.

According to a second aspect of the present invention, the manipulator comprises: a holding unit for holding an object; a rotary member for rotating the holding unit about a predetermined axis in a predetermined plane; a first actuator holding the rotary member and being movable in a first direction; a second actuator holding the first actuator and being movable in a second direction orthogonal to the first direction; a third actuator holding the second actuator and being movable in a third direction orthogonal to the second direction; and a control unit for driving the first, second and third actuators so as to parallelly move the rotary member in a direction opposite to a direction in which the center of the object is moved by rotation of the holding unit in rotating the holding unit holding the object in the plane by the rotary member.

Therefore, it is possible to offset the positional movement of the object occurring with the operation of the rotary member and each actuator is constituted of the minimum elements.

According to a third aspect of the present invention, the manipulator comprises: rectilinear movement means consisting of a plurality of linear actuators connected in sequence orthogonally to one another, having a plurality of degrees of rectilinear movement freedom; attitude change means having one end side connected to one of the plurality of linear actuators on the last stage and the other end side connected to a base side of the end effector, for changing an attitude of the end effector; and compensation control means for driving the rectilinear movement means so as to offset a positional movement of the object occurring with an attitude change of the end effector in changing the attitude of the end effector by the attitude change means.

Therefore, it is possible to offset the positional movement of the object occurring with the operation of the attitude change means and the manipulator is constituted of the minimum elements. Further, the link mechanism and the like can be simplified by connecting a plurality of linear actuators in sequence orthogonally to one another.

An object of the present invention is to provide a manipulator which is capable of offsetting the positional movement of an object occurring with a rotary operation with a relatively simple constitution and can be downsized with actuators constituted of the minimum elements.

These and other objects, features, aspects and advantages of the present invention will become more apparent from the following detailed description of the present invention when taken in conjunction with the occurring with drawings.

BRIEF DESCRIPTION OF THE DRAWINGS

FIG. 10 is an illustration showing an operation to offset a vector H in a horizontal direction by operating first and second linear actuators;

FIG. 11 is an illustration showing angles α, β and γ between the end effector and axes X, Y and Z;

DESCRIPTION OF THE PREFERRED EMBODIMENTS

Now, referring to figures, the preferred embodiment of the present invention will be discussed.

<1. Constitution of Micromanipulator>

Figure 1:
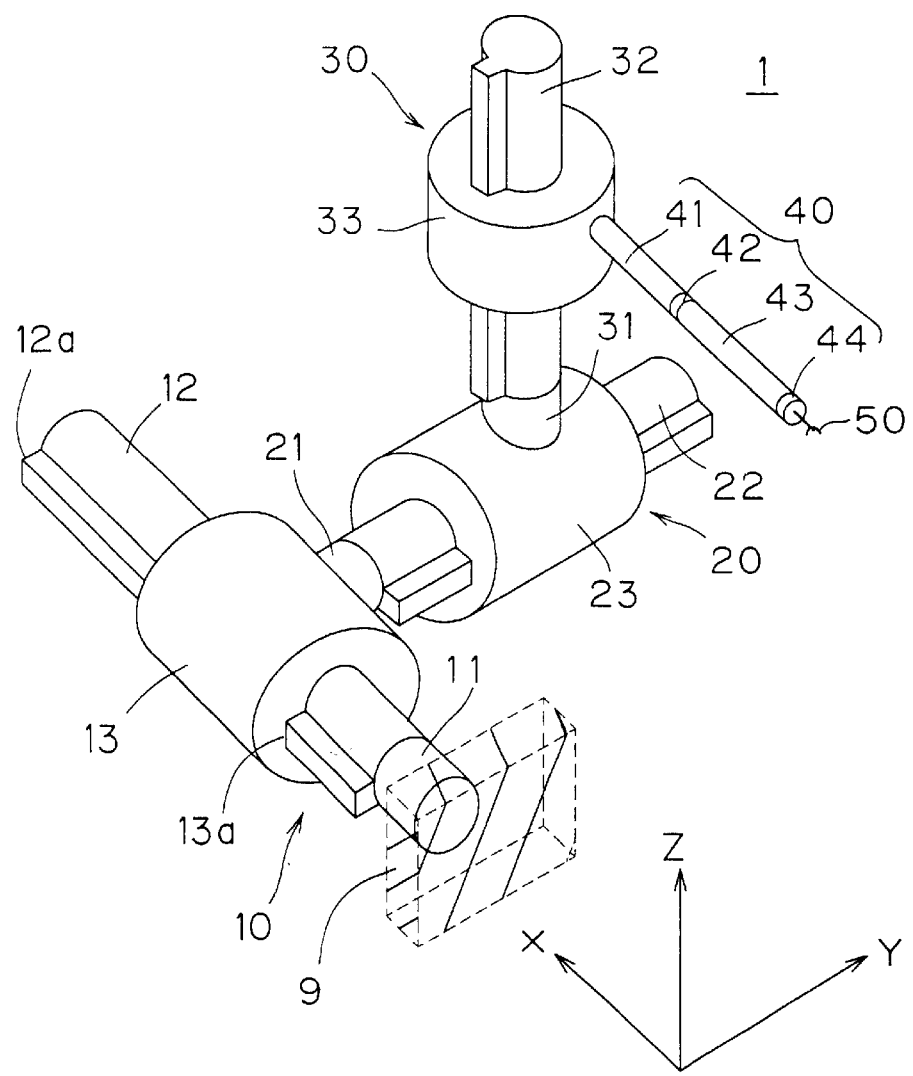
FIG. 1 is a schematic diagram showing a constitution of a micromanipulator 1 in accordance with a preferred embodiment of the present invention.

FIG. 1 is a schematic diagram showing a constitution of a micromanipulator 1 in accordance with the preferred embodiment of the present invention. In FIG. 1, reference characters X, Y and Z represent three axes orthogonal to one another.

The micromanipulator 1 comprises a first linear actuator 10, a second linear actuator 20, a third linear actuator 30, a rotary actuator 40 and an end effector 50.

The first to third linear actuators 10 to 30 are so connected in sequence as to be orthogonal to one another, serving as rectilinear movement means with a plurality of degrees of freedom in rectilinear movement. The rotary actuator 40 with the end effector 50 connected to its tip portion changes an attitude of the end effector 50 into an arbitrary angle to change an attitude of a microscopic object held by the end effect 50, serving as attitude change means.

The first linear actuator 10 comprises a piezo-electric element 11, a spline shaft 12 and a slider 13, and is so constructed as to move the slider 13 along a direction of X axis.

The piezo-electric element 11 is made of multilayer piezo-electric ceramics and the like and performs extension and contraction along the X-axis direction in response to voltage application by an externally-provided driving circuit. One end side of the piezo-electric element 11 is fixed to a fixing portion 9 indicated by the hatched part of this figure, and the other end side thereof is fixed to an end surface of the spline shaft 12. Therefore, the spline shaft 12 is moved along the X-axis direction, longitudinally, by the extension and contraction of the piezo-electric element 11. The fixing portion 9 is a member of an apparatus (such as a microscope) in which the micromanipulator 1 is installed.

The spline shaft 12 is fit in the slider 13, and the slider 13 is usually fixed in position relative to the spline shaft 12 with a constant friction generated between the spline shaft 12 and the slider 13 by a elastic member attached inside the slider 13. Further, it goes without saying that engagement of a convex portion 12a of the spline shaft 12 with a concave portion 13a of the slider 13 can suppress rotation of the slider 13 in the circumferential direction of the spline shaft 12.

The second linear actuator 20 also comprises a piezo-electric element 21, a spline shaft 22 and a slider 23, like the first linear actuator 10, and is so constructed as to move the slider 23 along a direction of Y axis. One end side of the piezo-electric element 21 is fixed to a side surface portion of the slider 13 of the first linear actuator 10, and the other end side thereof is fixed to an end surface of the spline shaft 22. Therefore, the spline shaft 22 is moved along the Y-axis direction, longitudinally, by the extension and contraction of the piezo-electric element 21. Further, the second linear actuator 20 has the same connection and construction of the piezo-electric element 21, the spline shaft 22 and the slider 23 as the first linear actuator 10.

The third linear actuator 30 also comprises a piezo-electric element 31, a spline shaft 32 and a slider 33, like the above linear actuators, and is so constructed as to move the slider 23 along a direction of Z axis. One end side of the piezo-electric element 31 is fixed to the slider 23 of the first linear actuator 20, and the other end side thereof is fixed to an end surface of the spline shaft 32. Therefore, the spline shaft 32 is moved along the Z-axis direction, longitudinally, by the extension and contraction of the piezo-electric element 31. Further, the second linear actuator 30 has the same connection and construction of the piezo-electric element 31, the spline shaft 32 and the slider 33 as the other linear actuators.

The rotary actuator 40 is fixed to the slider 33 of the third linear actuator 30 along the X-axis direction. The rotary actuator 40 comprises a stepping motor 41, a rotating plate 42, a pitch yaw actuator 43 and an inclining plate 44.

The stepping motor 41 has a cylindrical body with a small diameter and is fixed to the slider 33 of the third linear actuator 30 on the last stage of the rectilinear movement means. The rotating plate 42 connected to a rotor provided inside the stepping motor 41 is rotated about a rotation axis of the stepping motor 41 through energization of the stepping motor 41 by the externally-provided driving circuit. Furthermore, construction is not limited to that in FIG. 1 where the rotation axis of the stepping motor 41 is provided in parallel to the X axis. The stepping motor 41 provided as shown in FIG. 1 allows a rotation about a rotation axis in parallel to the X axis (rolling) among rotary operations.

One end side of the pitch yaw actuator 43 is attached to the rotating plate 42, and the pitch yaw actuator 43 rotates about the rotation axis of the stepping motor 41, accompanying the rotation of the rotating plate 42. The inclining plate 44 is provided on the other end side of the pitch yaw actuator 43 like a pivot, and the inclining plate 44 is inclined at an arbitrary angle in an arbitrary direction from a state where it is in parallel to the YZ plane by driving the pitch yaw actuator 43. The pitch yaw actuator 43 allows a rotation about a rotation axis in parallel to the Z axis (pitching) and a rotation about a rotation axis in parallel to the Y axis (yawing) among rotary operations.

Therefore, the rotary actuator 40 achieves any one of rotary operations about the X, Y and Z axes.

A base side of the end effector 50 of the micromanipulator 1 is connected to the tip portion of the rotary actuator 40. As the end effector 50, adopted is one with a mechanism suitable for a predetermined manipulation on the microscopic object. For example, a needle, a microgripper with a hand mechanism and the like are used as the end effector 50.

In the micromanipulator 1 with the above constitution, the first to third linear actuators 10 to 30 allow a rectilinear movement of the position of the end effector 50 in the three-axis directions of X, Y and Z and the rotary actuator 40 allows a rotary movement of the end effector 50 in the three directions, as roll, pitch and yaw. In other words, the above constitution achieves six degrees of freedom in total, specifically, three degrees of freedom in rectilinear movement of the end effector 50 and three degrees of freedom in rotary movement thereof. The three degrees of freedom in rotary movement is achieved with the roll-angle movement by the stepping motor 41 and the pitch-angle movement and the yaw-angle movement by the pitch yaw actuator 43.

Therefore, with the above constitution of the micromanipulator 1, it becomes possible to move the end effector 50 to any position and arbitrarily change the attitude of the end effector 50.

<2. Constitution of Linear Actuator>

Figure 2:
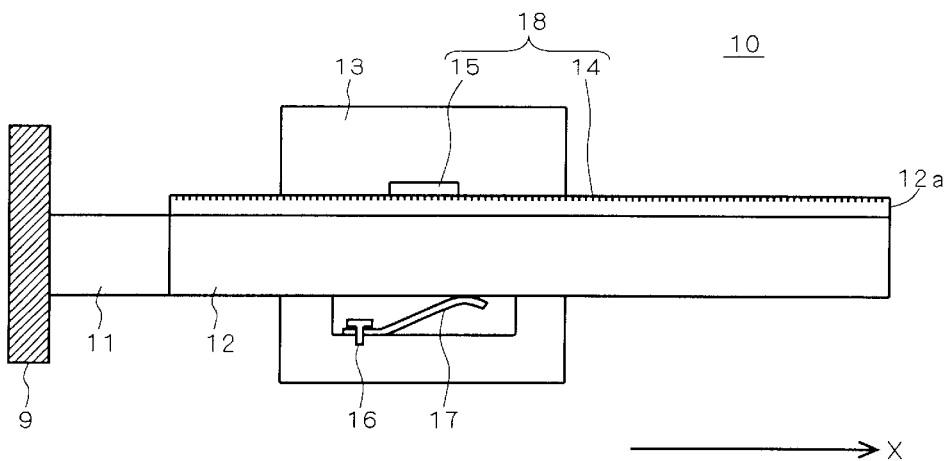
FIG. 2 is a cross section of a first linear actuator.

Next, detailed constitution of the first linear actuator 10 will be discussed. FIG. 2 is a cross section of the first linear actuator 10. Inside the slider 13, a reluctance element 15, a pin 16 and an elastic member 17 are provided. The convex portion 12a of the spline shaft 12 is provided with a magnetic pattern formation portion 14.

The elastic member 17 has a constitution in which one end side of a leaf spring member is fixed inside the slider 13 with the pin 16 and a surface of the other end side thereof is pressed against the spline shaft 12. With this elastic member 17, a constant friction is generated between the slider 13 and the spline shaft 12. The elastic member 17 has only to have a function of generating the constant friction between the slider 13 and the spline shaft 12, and may be a spring or other member, not limited to the leaf spring member.

Thus, the slider 13 of the first linear actuator 10 is fixed to the spline shaft 12 with the constant friction by the elastic member 17, and given a force larger than the friction, the slider 13 slides along the X-axis direction. Specifically, when the piezo-electric element 11 serving as driving means along the X-axis direction stops or gradually extends and contracts, since no force larger than the friction by the elastic member 17 is put on the slider 13, the position of the slider 13 relative to the spline shaft 12 is not changed. In contrast, when the piezo-electric element 11 instantaneously extends and contracts, an inertial force larger than the friction by the elastic member 17 is put on the slider 13, the position of the slider 13 relative to the spline shaft 12 moves in a direction opposite to the extension or contraction of the piezo-electric element 11.

The magnetic pattern formation portion 14 formed on the convex portion 12a of the spline shaft 12 is provided with magnetic patterns at almost equal intervals along the X-axis direction, and the reluctance element 15 provided inside the slider 13 so as to be opposed to the magnetic pattern formation portion 14 detects a movement of the magnetic patterns. Therefore, when the slider 13 moves along the spline shaft 12, since the magnetic patterns according to the amount of movement pass near the reluctance element 15, the reluctance element 15 generates a pulse waveform according to the amount of movement of the slider 13.

Figure 3A:
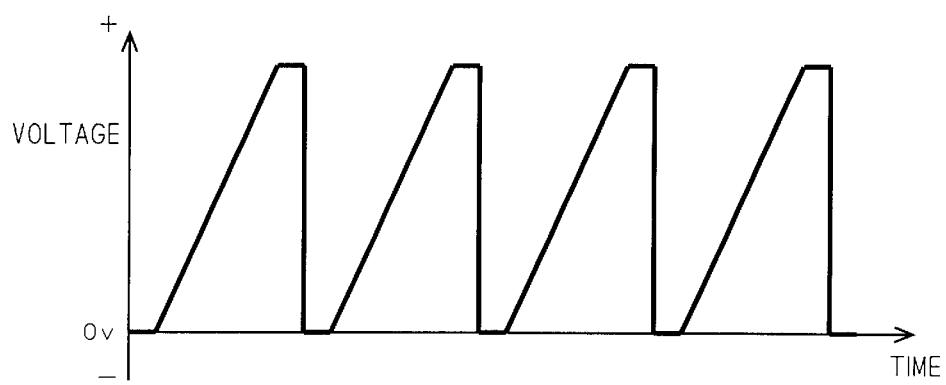
FIGS. 3A and 3B are views showing an example of waveforms of a voltage applied to a piezo-electric element.
Figure 3B:
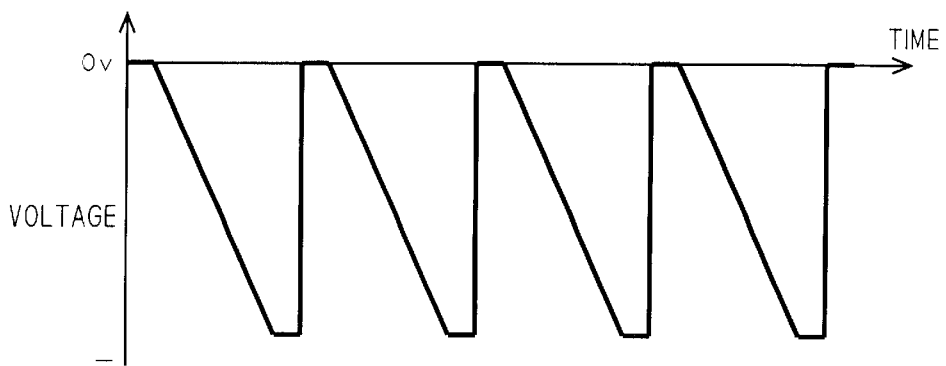

An operation of the first linear actuator 10 having the above constitution will be discussed below. FIGS. 3A and 3B are views showing asymmetrical serrate voltage waveforms as exemplary waveforms of a voltage applied to a piezo-electric element 11. FIG. 3A shows a voltage waveform at the time when the slider 13 moves along the +X direction and FIG. 3B shows a voltage waveform at the time when the slider 13 moves along the −X direction.

In this preferred embodiment, the piezo-electric element 11 contracts when a negative voltage is applied thereto and inversely it extends when a positive voltage is applied thereto. The amount of extension or contraction can be changed according to the absolute value (namely, magnitude) of the applied voltage. Therefore, the amount of extension/contraction can be controlled by controlling the voltage applied to the piezo-electric element 11 and consequently the movement of the spline shaft 12 along the X-axis direction can be controlled.

For example, the voltage waveform of FIG. 3A has a gentle slope at a rise and a sharp slope at a fall. Therefore, at the rise having the gentle-sloped serrate waveform, the slider 13 and the spline shaft 12 as a unit move along the X-axis direction according to the amount of extension/contraction of the piezo-electric element 11 by the friction between the spline shaft 12 and the slider 13.

On the other hand, at the fall having the sharp-slopped serrate waveform of FIG. 3A, the slider 13 is given a large inertial force to retain it at the position to which it moves while the piezo-electric element 11 intends to rapidly return to the initial position, and the inertial force becomes larger than the friction to thereby cause a slide between the slider 13 and the spline shaft 12. As a result, the slider 13 moves in the +X direction relative to the spline shaft 12 by the distance of the slide.

Then, by repeatedly applying the serrate waveform as shown in FIG. 3A to the piezo-electric element 11, the slider 13 moves in the +X direction along the spline shaft 12 step by step.

The voltage waveform of FIG. 3B is a reverse polarity to that of FIG. 3A. Specifically, the voltage waveform of FIG. 3B has a gentle slope at a rise in a negative direction and a sharp slope at a fall. Therefore, at the rise having the gentle-sloped serrate waveform, the slider 13 and the spline shaft 12 as a unit move along the X-axis direction according to the amount of extension/contraction of the piezo-electric element 11 by the friction between the spline shaft 12 and the slider 13. Since the piezo-electric element 11 contracts when the negative voltage is applied thereto, the piezo-electric element 11 slowly contracts at the gentle-sloped rise in FIG. 3B. In contrast, at the sharp-slopped fall of FIG. 3B, since the piezo-electric element 11 intends to rapidly return to the initial position from the state where it has contracted, a large inertial force is put on the slider 13 and this inertial force becomes larger than the friction to thereby cause a slide between the slider 13 and the spline shaft 12. As a result, the slider 13 moves in the −X direction relative to the spline shaft 12 by the distance of the slide.

Then, by repeatedly applying the serrate waveform as shown in FIG. 3B to the piezo-electric element 11, the slider 13 moves towards the −X direction along the spline shaft 12 step by step.

Thus, the first linear actuator 10 can reciprocate the spline shaft 12 connected to the piezo-electric element 11 by reciprocating the piezo-electric element 11 serving as driving means at an asymmetrical speed, and thereby causes the slider 13 to perform a relatively-inertial movement. In other words, the first linear actuator 10 effectively use the friction between the spline shaft 12 and the slider 13 by the elastic member 17 and the inertial force exerted on the slider 13 to cause the slide between the slider 13 and the spline shaft 12 in a predetermine direction and consequently a stick-slip driving mechanism in which the slider 13 moves relative to the spline shaft 12 is achieved.

Further, since the constant friction is generated by the elastic member 17, if the applied voltage in driving the piezo-electric element 11 is strictly controlled, it is possible to control the amount of movement of the slider 13 for one slide to almost constant value. In other words, by controlling the voltage level and inclination in the waveform of the applied voltage, it is possible to change the amount of movement of the slider 13 for one slide. For example, if the voltage level is set higher and the sharp slope at the fall is made sharper, since the amount of movement for one slide becomes larger, it becomes possible to move the end effector 50 at higher speed. Inversely, if the voltage level is set lower and the sharp slope at the fall is made slightly gentler, since the amount of movement for one slide becomes smaller, it becomes possible to move the end effector 50 at lower speed by very small amount.

When the voltage of the above serrate waveform is successively applied to the piezo-electric element 11, the movement of the slider 13 becomes a flutter which is a movement step by step. In contrast, by controlling the value of voltage applied to the piezo-electric element 11, since the piezo-electric element 11 extends or contracts according to the voltage value, the movement of the slider 13 becomes a tremor which is a successive movement within a very small range. Therefore, using the piezo-electric element as driving means of the linear actuator allows separate use of flutter and tremor, thereby enhancing the precision in position of the slider 13.

The magnetic pattern formation portion 14 formed in the convex portion 12*a* of the spline shaft 12 and the reluctance element 15 provided inside the slider 13 constitute a linear encoder 18 as a unit, and the reluctance element 15 generates a pulse signal according to the amount of movement of the slider 13. Then, it is possible to detect the position of the slider 13 relative to the spline shaft 12 by performing a predetermined operation on the basis of the pulse signal.

The above discussion is directed to the constitution and operation of the first linear actuator 10. Since the second and third linear actuators 20 and 30 have the same constitution and operation as above, discussion on those of the second and third linear actuators 20 and 30 will be omitted.

Since the first to third linear actuators 10 to 30 are driven by application of voltage as electric energy as discussed above, no hydraulic transport system by oil pressure or water pressure is required. Therefore, it is possible to reduce the size of wiring system in the transport mechanism of control system and the micromanipulator 1 can be downsized.

Further, in the first to third linear actuators 10 to 30, since functional means necessary for a linear actuator is constituted of the minimum number of parts as is clear from that the spline shaft has both functions of a linear guide for guiding the movement in a rectilinear direction and a driving transport mechanism for transporting a power generated by driving means, it becomes possible to further downsize the micromanipulator 1.

<3. Constitution of Rotary Actuator>

Next, detailed constitution of the rotary actuator 40 will be discussed. As mentioned earlier, the rotary actuator 40 comprises the stepping motor 41 serving as first rotary driving means on the roll angle and the pitch yaw actuator 43 serving as second rotary driving means on the pitch and yaw angles.

Figure 4:
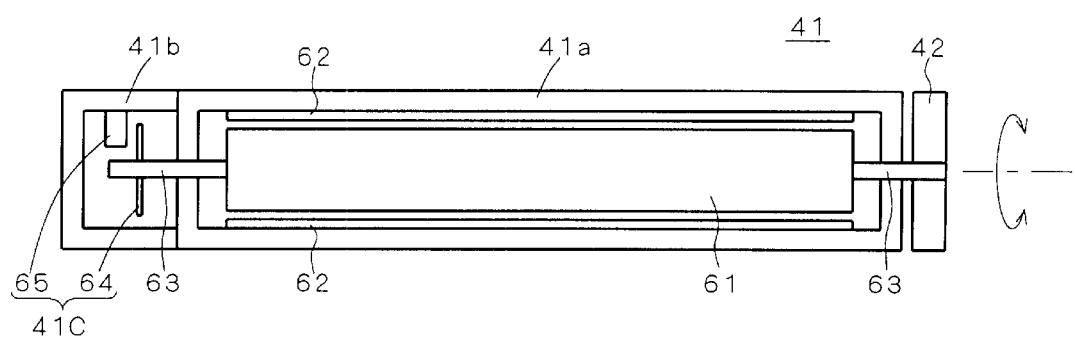
FIG. 4 is a cross section of a stepping motor.

First, discussion will be made on the stepping motor 41. FIG. 4 is a cross section of the stepping motor 41. The stepping motor 41 has a cylindrical body 41*a* which is a main body and an encoder unit 41*b* connected to one end side of the cylindrical body 41*a*. The other end side of the cylindrical body 41*a* is provided with the rotating plate 42.

Inside the cylindrical body 41*a*, provided are a rotor 61, a rotor shaft 63 and a stator coil 62. The stator coil 62 is fixed to an inner wall of the cylindrical body 41*a*, the rotor shaft 63 is so provided as to penetrate the center of the cylindrical body 41*a* and the rotor 61 is fixed to the rotor shaft 63. The rotor 61 is out of contact with the stator coil 62, and this allows the rotor 61 to rotate about the rotor shaft 63 at a required angle in a required direction by controlling energization of the stator coil 62 by a driving circuit discussed later. Then, with this rotation of the rotor 61, the rotor shaft 63 is rotated as a unit with the rotor 61, to rotate the rotating plate 42 connected to the rotor shaft 63.

Further, in the encoder unit 41*b*, a rotary encoder plate 64 for detecting a rotation angle is fixed near a tip portion of the rotor shaft 63 which is provided extendedly from the cylindrical body 41*a*. In the rotary encoder plate 64, predetermined magnetic signals are recorded or slits of predetermined shape are formed at intervals of predetermined angle in a direction of rotation. A position sensor 65 made of a reluctance element, an optical sensor or the like is attached to the inner wall of the encoder unit 41*b*, and when the rotary encoder plate 64 and the rotor shaft 63 rotate as a unit, the position sensor 65 generates a predetermined pulse signal according to the rotation angle. Thus, the rotary encoder plate 64 and the position sensor 65 provided inside the encoder unit 41*b* constitute a rotary encoder 41*c* for detecting a direction of rotation and an angle of rotation (roll angle) by the stepping motor 41.

Figure 5:
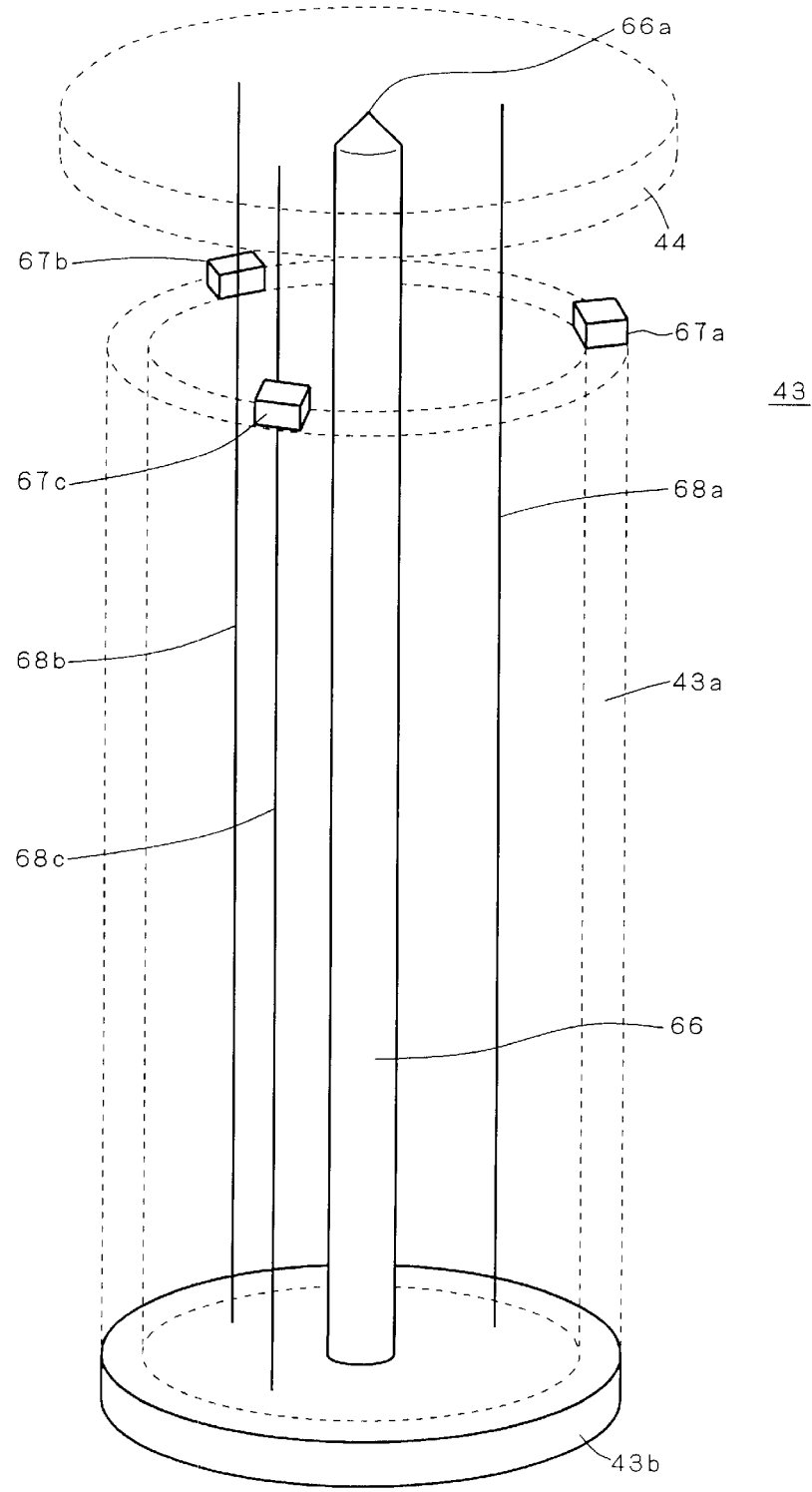
FIG. 5 is a schematic diagram showing a constitution of a pitch yaw actuator.

Next, discussion will be made on the pitch yaw actuator 43. FIG. 5 is a schematic diagram showing a constitution of the pitch yaw actuator 43. In FIG. 5, for easy understanding of its inner structure, a cylindrical body 43*a* which is a main body of the pitch yaw actuator 43 and the inclining plate 44 are represented by broken lines.

A bottom plate 43*b* is fixed to one end side of the cylindrical body 43*a* (the lower end side of FIG. 5) and the rotating plate 42 driven by the stepping motor 41 to rotate is connected to a rear surface side of the bottom plate 43*b*. A supporting pole 66 is attached to the center position of the bottom plate 43*b* so as to be perpendicular to a front surface of the bottom plate 43. Since the longitudinal length of the supporting pole 66 is designed to be longer than that of the cylindrical body 43*a*, a tip portion of the supporting pole 66 extends off an end side of the cylindrical body 43*a* as shown in FIG The tip portion of the supporting pole 66 forms a pivot 66*a*, which supports the center position on the rear surface of the inclining plate 44. At least three wires 68*a*, 68*b* and 68*c* each made of shape memory alloy are extended between the rear surface side of the inclining plate 44 and the front surface side of the bottom plate 43*b*. One end sides of the wires 68*a* to 68*c* are set at intervals of equal angle with respect to the center position of the inclining plate 44 supported by the pivot 66*a* and connected circumferentially to positions at an equal distance from the center position. On the other hand, the other end sides of the wires 68*a* to 68*c* are connected to the bottom plate 43*b* at intervals of equal angle with respect to the center position of the supporting pole 66 and circumferentially at an equal distance from the center position, like connection to the inclining plate 44.

Given an equal tension, the wires 68*a* to 68*c* are provided between the inclining plate 44 and the bottom plate 43*b*.

Therefore, in a normal state, the tensions of the wires 68a to 68c are balanced to bring the inclining plate 44 to rest, being perpendicular to the supporting pole 66.

At positions near the wires 68a to 68c on the end side of the cylindrical body 43a opposed to the inclining plate 44, distance sensors 67a, 67b and 67c are provided as means for detecting the distances from the inclining plate 44 on the positions. The wires 68a to 68c each made of shape memory alloy are heated through individual energization by a driving circuit described later, to be consequently contracted. The amount of contraction of each wire can be arbitrarily controlled by individually controlling a current value in energization.

Then, when any of the wires 68a to 68c is energized, the balance among the tensions of the wires is broken and the inclining plate 44 is pulled by the tension of the contracting wire to be inclined from the state where it is perpendicular to the supporting pole 66.

Figure 6A:
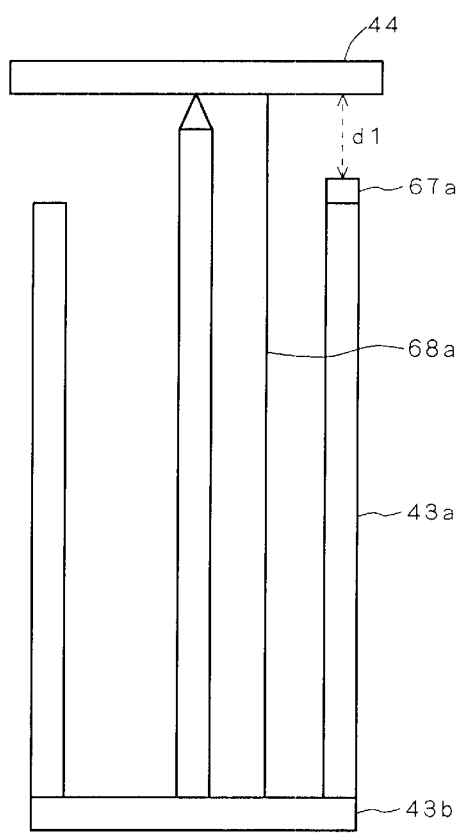
FIGS. 6A and 6B are schematic diagrams showing an operation of the pitch yaw actuator.
Figure 6B:
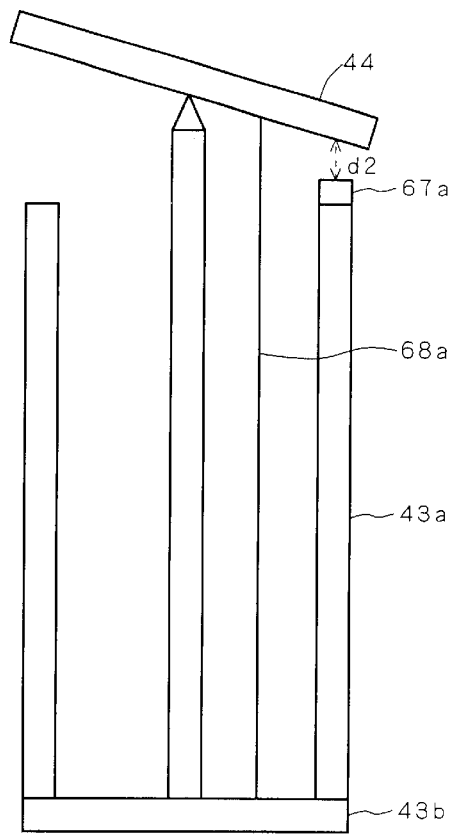

FIGS. 6A and 6B are schematic diagrams showing an operation of the pitch yaw actuator 43. These figures each show a cross section including one wire, i.e., the wire 68a. FIG. 6A shows a state where the tensions of the wires 68a to 68c are well balanced and FIG. 6B shows a state where the inclining plate 44 is inclined through energization of the wire 68a. When any one of the three wires 68a to 68c is energized, the inclining plate 44 is inclined to a side on which the energized wire is provided. Further, when any two of the three wires 68a to 68c are equally energized, the inclining plate 44 is inclined to a side of the center of the positions at which the two energized wires are provided. If the energizations of the two wires are individually controlled, it is possible to incline the inclining plate 44 in an arbitrary direction and control the inclination angle to an arbitrary angle.

The distance sensor 67a provided near the wire 68a detects a distance d2 from the inclining plate 44 in the state there the tensions are balanced as shown in FIG. 6A and a distance d2 from the inclining plate 44 in the state where the inclining plate 44 is inclined. This also applies to the other distance sensors 67b and 67c. Therefore, since it is known on design which positions of the inclining plate 44 the distance sensors 67a to 67c correspond to, by performing a predetermined operation on the basis of the detection result of the distance sensors 67a to 67c, it becomes possible to obtain direction and angle of inclination of the inclining plate 44.

Figure 7:
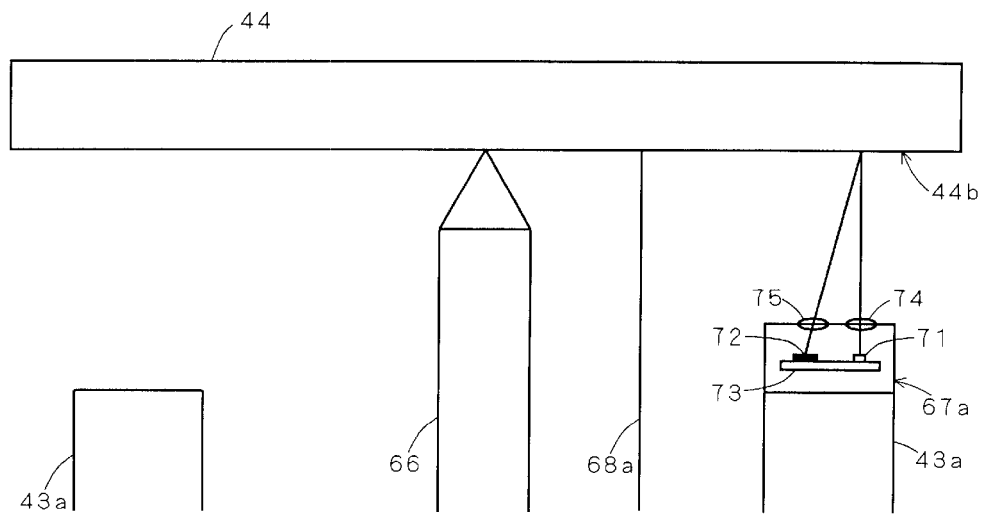
FIG. 7 is an enlarged view of a tip portion of the pitch yaw actuator.

Now, constitution of the distance sensor 67a will be discussed. FIG. 7 is an enlarged view showing a tip portion of the pitch yaw actuator 43. The distance sensor 67a is a compact-type optical sensor of triangular ranging system, and comprises a light emitting element 71, a photodetector element 72, a substrate 73 and micro lenses 74 and 75. The light emitting element 71 and the photodetector element 72 are mounted on the substrate 73 and the substrate 73 is fixed inside the distance sensor 67a. A light from the light emitting element 71 is applied to a rear surface side 44b of the inclining plate 44 by the micro lens 74 and a reflected light diffusely reflected on the rear surface side 44b of the inclining plate 44 is projected on the photodetector element 72.

A light detecting surface of the photodetector element 72 is divided into two so as to have two detecting surfaces in directions where a beam of reflected light travels with variation in inclination angle of the inclining plate 44, and the divided detecting surfaces can detect the received amount of reflected light. Referring to a ratio of outputs from the respective divided detecting surfaces, it is possible to know which one of the divided detecting surfaces a centroid of the beam of the reflected light is positioned on. Since the centroid position of the beam has a correlation with the distance between the inclining plate 44 and the distance sensor 67a, by obtaining the ratio of outputs from the divided detecting surfaces, it becomes possible to obtain a distance between the distance sensor 67a and the inclining plate 44.

Though the above discussion has been made on the constitution of the distance sensor 67a, the other distance sensors 67b and 67c have the same constitution.

Then, by performing a predetermined operation from the distance information obtained by the three distance sensors 67a to 67c, it becomes possible to obtain the direction and angle of inclination of the inclining plate 44.

Though an incident angle of the light from the light emitting element 71 to the inclining plate 44 is changed with variation in inclination angle of the inclining plate 44, since the distance sensors 67a to 67c can detect the diffuse reflection light on the rear surface side 44b of the inclining plate 44, it is possible to measure the distance from the inclining plate 44 with no problem. Further, since the distance sensors 67a to 67c measures a distance (between the rear surface side 44b of the inclining plate 44 and the micro lens 74) of about one meter, it is possible to measure the distance with high precision even when the base length of the triangular ranging (the distance between the micro lenses 74 and 75) is about 200 to 300 $\mu$m, and the distance sensor can be considerably downsized.

Furthermore, there may be a case where the detecting surface of the photodetector element 72 is not divided into two, having a single surface, and after measuring the amount of light reflected on the inclining plate 44, the distance between the inclining plate 44 and each of the distance sensors 67a to 67c is measured from the amount of reflected light.

The pitch yaw actuator 43 is constructed as above, so that the inclining plate 44 can be inclined to any direction and at any angle by controlling energization of the wires 68a to 68c and the distance sensor 67a to 67c can detect the direction and angle of inclination of the inclining plate 44.

The rotary actuator 40 can drive the end effector 50 to rotate about the rotation axis parallel to the X axis in the direction of roll angle by the stepping motor 41, and the pitch yaw actuator 43 can drive the end effector 50 to rotate about the rotation axis parallel to the Y axis in the direction of pitch angle and about the rotation axis parallel to the Z axis in the direction of yaw angle.

Since the stepping motor 41 and the pitch yaw actuator 43 constituting the rotary actuator 40 can be driven by energization as an electric energy as above, no necessity of hydraulic transport system by oil pressure or water pressure allows reduction in size of wiring system in the transport mechanism of control system, thereby ensuring downsizing of the micromanipulator 1.

<4. Operation of Micromanipulator>

Figure 8:
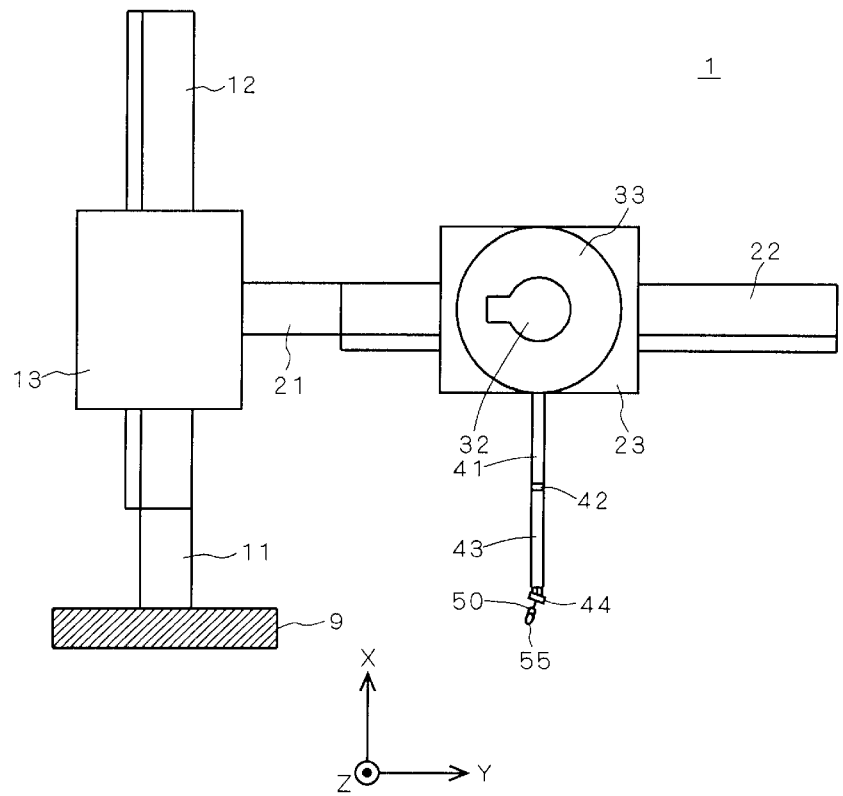
FIG. 8 is an illustration of the micromanipulator as viewed from above.

Next, an operation of the micromanipulator 1 will be discussed. FIG. 8 is an illustration of the micromanipulator 1 as viewed from above. FIG. 8 illustrates a case where the end effector 50 holding the object 55 operates in the direction of yaw angle in a horizontal plane (XY plane).

Figure 9:
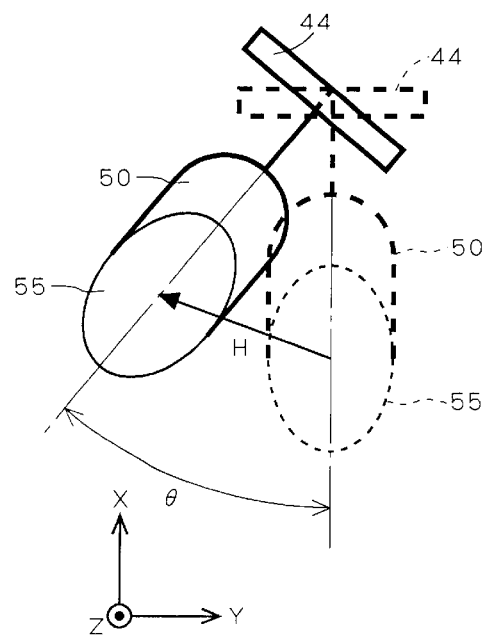
FIG. 9 is an enlarged view of an inclining plate, an end effector and an object.

FIG. 9 is an enlarged view of the inclining plate 44, then end effector 50 and the object 55 of FIG. 8. As shown in FIG. 9, the pitch yaw actuator 43 is driven and the inclining plate 44 is inclined by an angle of θ degrees perpendicularly about the rotation axis in parallel to the Z axis. In FIG. 9, a state before inclining the inclining plate 44 is represented by broken lines.

As shown in FIG. 9, since a center of rotation in inclination of the inclining plate 44 is positioned outside the object 55, the attitude of the object 55 changes according to the angle of θ through the operation of the pitch yaw actuator 43 and the position thereof in the XY plane also changes. In other words, through the operation of the pitch yaw actuator 43, the object 55 performs not only the yaw rotation of θ degrees but also the movement in the horizontal direction as indicated by a vector H at the same time. The movement in the horizontal direction (vector H) is an operation not necessary for the microscopic operation.

Then, this preferred embodiment solves the problem that the object 55 moves in the horizontal direction when the rotary actuator 40 is driven, by operating the first to third linear actuators 10 to 30 so as to offset the movement of the object 55 in the horizontal direction caused by driving the rotary actuator 40.

FIG. 10 is an illustration showing an operation to offset the vector H in the horizontal direction by operating first and second linear actuators 10 and 20.

First, when the pitch yaw actuator 43 is driven to have the end effector 50 perform the yaw operation (the rotary operation of angle θ shown in FIG. 9), the vector H which is a movement locus of the object 55 when only the yaw operation is performed on the basis of the angle θ to change the attitude of the object 55 is predicted before the actual yaw operation. The predicted vector H is divided into two direction components, i.e., the X-axis direction component which is a direction of driving the first linear actuator 10 and the Y-axis direction component which is a direction of driving the second linear actuator 20.

Then obtained are vectors C1 and C2 in directions opposite to the respective vectors obtained by dividing the vector H into the X-axis direction component and the Y-axis direction component (see FIG. 10). The vector C1 represents the amount of driving the first linear actuator 10 and the vector C2 represents the amount of driving the second linear actuator 20. Therefore, if the first and second linear actuators 10 and 20 are driven at the same time on the basis of the vectors C1 and C2 thus obtained when the yaw operation is actually performed, the object 55 held by the end effector 50 can only change its attitude without its horizontal movement.

Though only the yaw operation of the rotary actuator 40 has been discussed in the above example, for simple discussion, this preferred embodiment is not limited to this but can be applied to other rotary operation and an operation combining the respective rotary operations. So, unnecessary positional movement vector other than the roll, pitch and yaw operations which are necessary for the microscopic manipulation can be offset (compensated) through combination of rectilinear movement in the three-axis directions by individually driving the first to third linear actuators 10 to 30.

Now, an example of obtaining the amounts of rectilinear movements (the above vectors C1 and C2) to offset the attitude change of the end effector 50 will be generally discussed. Though it is natural that any angle system such as zenith angle and azimuth angle other than the angle system consisting of roll, pitch and yaw can be adopted as the amount of angle to quantitatively represent the attitude of the end effector 50, discussion will be made using direction cosine towards the angle coordinate axis, for easy understanding. Since the principle for mutual conversion between any angle systems is well known, the following expressions can be represented with other angle systems by using the conversion formula.

FIG. 11 is an illustration showing angles α, β and γ between the end effector 50 and axes X, Y and Z, respectively. The angle α represents the angle between the end effector 50 and X axis, the angle β represents the angle between the end effector 50 and Y axis and the angle γ represents the angle between the end effector 50 and Z axis. Further, an effective length for which the end effector 50 performs oscillation from the center position of rotation (the pivot 66a of the inclining plate 44 in this preferred embodiment) in rotation such as rolling to a working point (the center position of the object 55 held by the end effector 50) is assumed to be L.

Assuming that the direction cosines of the working point of the end effector 50 with respect to the X, Y and Z axes before changing its attitude is cos α0, cos β0 and cos γ0, respectively, the coordinates (X0, Y0, Z0) of the working point of the end effector 50 in this state with the center position of rotation used as zero point are expressed as;

$X0 = L \cdot \cos \alpha 0$ $Y0 = L \cdot \cos \beta 0$ $Z0 = L \cdot \cos \gamma 0$ On the other hand, when the attitude of the end effector 50 is changed without offsetting the positional movement, i.e., without compensation, assuming that the direction cosines of the working point of the end effector 50 with respect to the X, Y and Z axes after the attitude change is cos α1, cos β1 and cos γ1, respectively, the coordinates (X1, Y1, Z1) of the working point of the end effector 50 in this state are expressed as;

$X1 = L \cdot \cos \alpha 1$ $Y1 = L \cdot \cos \gamma 1$ $Z1 = L \cdot \cos \gamma 1$ Therefore, the amounts of positional movement in the respective axis directions of the working portion of the end effector 50 occurring with the attitude change are expressed as;

$X1 - X0 = L \cdot (\cos \alpha 1 - \cos \alpha 0)$ $Y1 - Y0 = L \cdot (\cos \beta 1 - \cos \beta 0)$ $Z1 - Z0 = L \cdot (\cos \gamma 1 - \cos \gamma 0)$ This corresponds to the above vector H. Then, by driving the end effector 50 to rectilinearly move in the X, Y and Z-axis directions by -(X1-X0), -(Y1-Y0) and -(Z1-Z0), respectively, it is possible to offset the positional movement of the working point occurring with the attitude change to compensate it.

Though this rectilinear-movement driving allows appropriate compensation of the positional movement of the object before and after the attitude change, it is preferable in microscopic manipulation to compensate the positional movement of the object on the way of the attitude change. Then, by controlling the driving operation in synchronization with compensation of the amount of attitude change and the amount of rectilinear-movement driving at a predetermined microscopic intervals, it becomes possible to compensate the positional movement of the object on the way of the attitude change.

In other words, since the microscopic increments $\Delta X$, $\Delta Y$ and $\Delta Z$ of the X-, Y- and Z-axis direction components corresponding to microscopic changes $\Delta\alpha, \Delta\beta$ and $\Delta\gamma$ of the angles $\alpha$, $\beta$ and $\gamma$ are expressed in a differential form of general relations, $$X = L \cdot \cos \alpha$$
$$Y = L \cdot \cos \beta$$
$$Z = L \cdot \cos \gamma$$

as;

$$\Delta X = -L \cdot \sin \alpha \cdot \Delta\alpha$$
$$\Delta Y = -L \cdot \sin \beta \cdot \Delta\beta$$
$$\Delta Z = -L \cdot \sin \gamma \cdot \Delta\gamma,$$

by driving the end effector 50 to rectilinearly move by $(-\Delta X)$, $(-\Delta Y)$ and $(-\Delta Z)$ in the X-, Y- and Z-axis directions, respectively, each time when the angles $\alpha$, $\beta$ and $\gamma$ change by the amounts of microscopic change $\Delta\alpha$, $\Delta\beta$ and $\Delta\gamma$, it is possible to compensate the positional movement of the object on the way of the attitude change.

<5. Control Mechanism of Micromanipulator>

Figure 12:
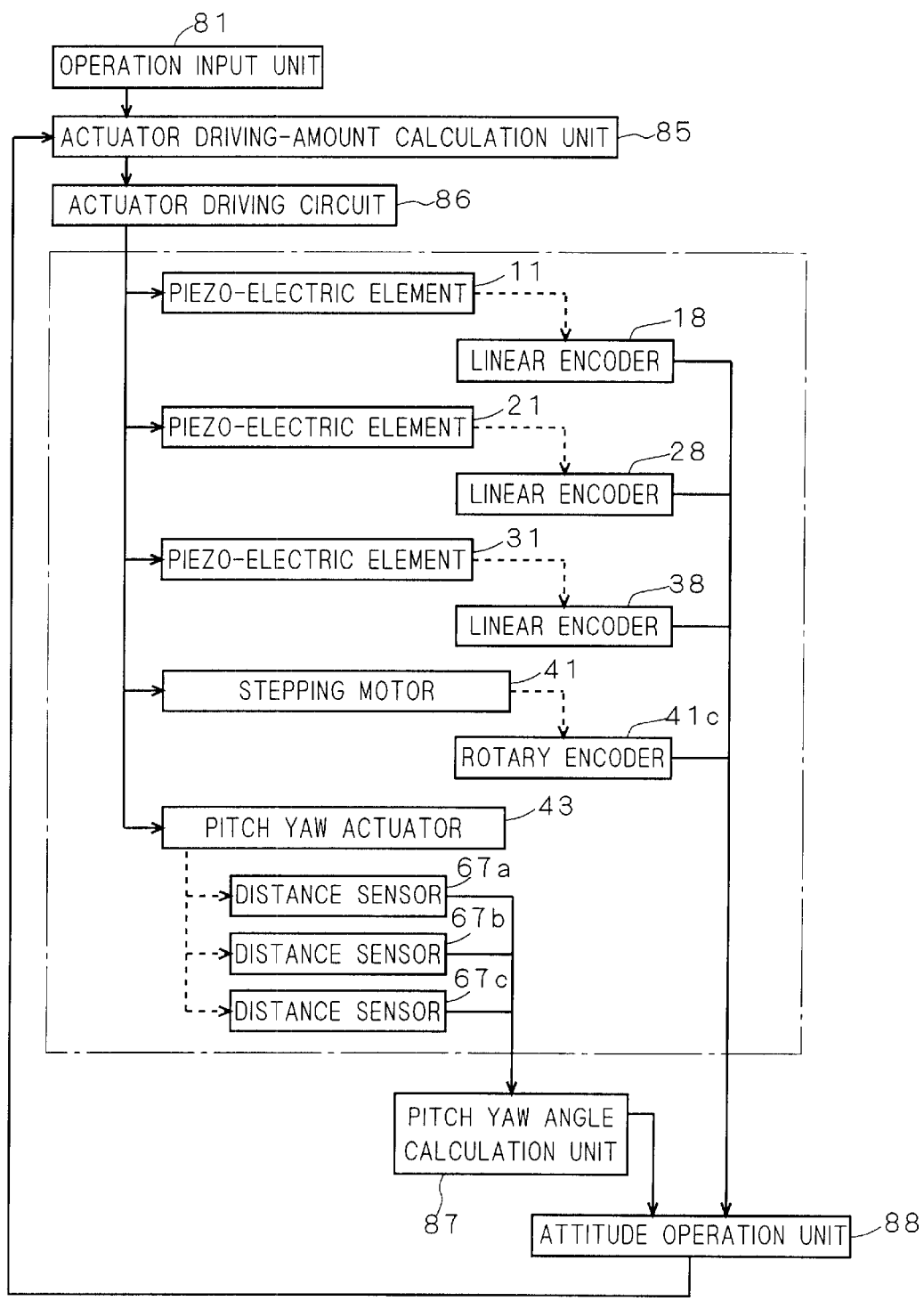
FIG. 12 is a block diagram showing a first constitution example of a control mechanism of the micromanipulator.
Figure 13:
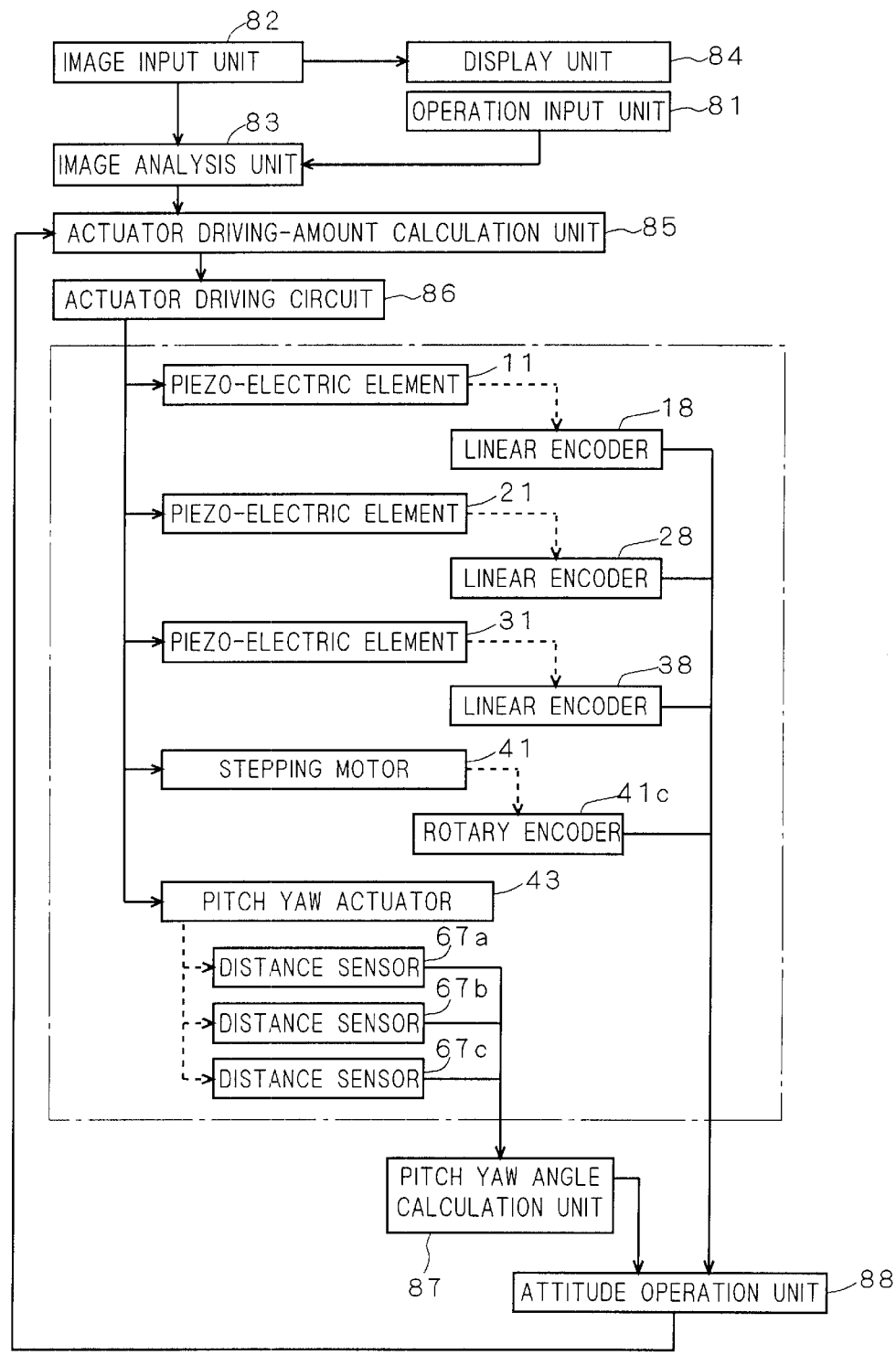
FIG. 13 is a block diagram showing a second constitution example of a control mechanism of the micromanipulator.

Next, a control mechanism as control means for the above operation will be discussed. FIGS. 12 and 13 are block diagrams showing control mechanisms of the micromanipulator 1. FIG. 12 shows the first constitution example and FIG. 13 shows the second constitution example.

First, the first constitution example will be discussed. As shown in FIG. 12, a first control mechanism comprises an operation input unit 81, an actuator driving-amount calculation unit 85, an actuator driving circuit 86, a pitch yaw angle calculation unit 87 and an attitude operation unit 88, to drive the actuators.

In FIG. 12, a portion surrounded by the alternate long and short dash line shows the above-described constitution of the driving mechanisms of the micromanipulator 1. The piezo-electric element 11 and the linear encoder 18 provided in the first linear actuator 10 serve as driving means and movement-amount detection means, respectively, with respect to the X-axis direction. The piezo-electric element 21 and the linear encoder 28 provided in the second linear actuator 20 serve as driving means and movement-amount detection means, respectively, with respect to the Y-axis direction. The piezo-electric element 31 and the linear encoder 38 provided in the third linear actuator 30 serve as driving means and movement-amount detection means, respectively, with respect to the Z-axis direction.

The operation input unit 81 is an interface portion which allows an operator to input manipulating operations to be performed by the end effector 50 of the micromanipulator 1, and a keyboard, a pointing device and the like are used therefor. Information on the manipulating operation inputted by the operation input unit 81 is called manipulation information.

The actuator driving-amount calculation unit 85 calculates the respective amounts of driving operations for the actuators for the six degrees of freedom achieved by the first to third linear actuators 10 to 30 and the stepping motor 41 and the pitch yaw actuator 43 of the rotary actuator 40. In other words, the actuator driving-amount calculation unit 85 works as driving-amount determination means in driving the actuators.

The actuator driving circuit 86 is driving control means for controlling the driving operations individually for the first to third linear actuators 10 to 30, the stepping motor 41 and the pitch yaw actuator 43 on the basis of the respective amounts of driving operations for the actuators obtained by the actuator driving-amount calculation unit 85.

The pitch yaw angle calculation unit 87 calculates the pitch angle and the yaw angle of the end effector 50 from the distance information between the distance sensors 67a to 67c and the inclining plate 44 detected by the distance sensors 67a to 67c provided in the pitch yaw actuator 43.

The attitude operation unit 88 performs a predetermined operation on the basis of the amounts of movements along the X-, Y- and Z-axis directions detected by the linear encoders 18, 28 and 38, respectively, the roll angle detected by the rotary encoder 41c and the pitch angle and the yaw angle obtained by the pitch yaw angle calculation unit 87, to obtain the attitude and position of the end effector 50 (or the object 55) in real time. Therefore, in the attitude operation unit 88, the current attitude and position of the end effector 50 (or the object 55) are obtained with respect to the six degrees of freedom of the micromanipulator 1. Information on the attitude and position obtained through operation (attitude-position information) is fed back to the actuator driving-amount calculation unit 85.

The actuator driving-amount calculation unit 85 calculates necessary amounts of driving operations for the actuators as occasion requires on the basis of the manipulation information inputted by the operation input unit 81 and the attitude-position information obtained by the attitude operation unit 88 on the end effector 50, to obtain the amount of driving operation. This calculation includes that of the amounts of driving operations for the first to third linear actuators 10 to 30 required to compensate the unnecessary positional movement occurring with the operation of the rotary actuator 40.

In short, the actuator driving-amount calculation unit 85 obtains the amount of driving operation in the direction of rotation in driving the rotary actuator 40 from the manipulation information and obtains the movement locus of the object 55 in a case where the linear actuators are not driven from the amount of driving operation in the direction of rotation. Then, by breaking the movement locus down into the X-, Y- and Z-axis direction components, the amounts of driving operations in driving the linear actuators are obtained.

Therefore, the actuator driving-amount calculation unit 85 works as means for compensating the unnecessary positional movement of the object 55 in operating the micromanipulator 1. The actuator driving circuit 86 individually drives the actuators on the basis of the respective amounts of driving operations for the actuators inputted from the actuator driving-amount calculation unit 85 as occasion arises.

With this constitution of the control mechanism, the result of driving operations for the actuators is reflected on the outputs from the linear encoders 18, 28 and 38, the rotary encoder 41c and the distance sensors 67a, 67b and 67c, and the feed-back control of the actuators can be performed on the basis of variation in these outputs. As a result, the operation inputted to the manipulating operation input unit 81 is given to the object 55 with precision.

Such a control mechanism as shown in FIG. 12, i.e., the control mechanism comprising the operation input unit 81, the actuator driving-amount calculation unit 85, the actuator driving circuit 86, the pitch yaw angle calculation unit 87 and the attitude operation unit 88, works as compensation control means for controlling driving operations for the linear actuators which are rectilinear movement means so as to offset the positional movement of the object occurring with the attitude change of the end effector 50 in changing the attitude of the end effector 50 by the rotary actuator 40.

Next, the second constitution example will be discussed. As shown in FIG. 13, the second control mechanism has a constitution in which functions of image input and image analysis are incorporated in the first constitution example, and comprises an image input unit 82, an image analysis unit 83 and a display unit 84 besides the above-described constitution.

Further, also in FIG. 13, a portion surrounded by the alternate long and short dash line shows the above-described constitution of the driving mechanisms of the early-described micromanipulator 1.

As the image input unit 82, a camera or the like is used. The image input unit 82 inputs an image by imaging states of the end effector 50 of the micromanipulator 1 and the object 55. Then, the image input unit 82 generates image data for image analysis to be given to the image analysis unit 83 and image data for display to be given to the display unit 84 from the inputted image, and supplies the image analysis unit 83 and the display unit 84 with these image data. The image data is two-dimensional image data or three-dimensional image data depending on the use.

The image analysis unit 83 analyzes the two- or three-dimensional image data for image analysis supplied by the image input unit 82, to obtain the current attitude and position of the end effector 50 (or the object 55). Further, the manipulation information on the object 55 is inputted to the image analysis unit 83 from the operation input unit 81. Since the manipulation information indicates targeted final attitude and position and the image data indicates the current attitude and position, the image analysis unit 83 analyzes the image data on the manipulation information, to obtain a difference between the current state and the target state of the object 55. The difference between the current and target states is given to the actuator driving-amount calculation unit 85.

The display unit 84 is image display means such as a CRT and a liquid crystal display and has a function of displaying the current state of the end effector 50 (or the object 55) and the content inputted by the operation input unit 81 to the operator. Therefore, the operator can easily determine how to drive the end effector 50 while watching the current image of the object 55 and can perform a setting input using a cursor on a screen and a numerical input using a keyboard while visually checking the screen.

When a pointing device is used as the operation input unit 81, either a device for two dimension or that for three dimension may be used depending on the type of the image data, or a device for both two dimension and three dimension may be used.

Then, the actuator driving-amount calculation unit 85 calculates the necessary amounts of driving operations for the actuators on the basis of the difference between the current and target states given from the image analysis unit 83. The calculation result is inputted to the actuator driving circuit 86, which thereby drives the actuators by the necessary amounts. The result of driving operations for the actuators is reflected on the outputs from the linear encoders 18, 28 and 38, the rotary encoder 41c and the distance sensors 67a, 67b and 67c, and it becomes possible to perform a feed-back control of the actuators on the basis of variation in these outputs. As a result, the manipulation information inputted to the operation input unit 81 is given to the object 55 with precision.

There are some examples of control performed with this constitution.

For example, as a first control method, the driving operation is completed when the amount of movement necessary to manipulate the object 55 is detected from the outputs of the linear encoders 18, 28 and 38, the rotary encoder 41c and the distance sensors 67a, 67b and 67c. As a second control method, the image input unit 82 images the objects 55 on the last stage of the manipulating operation put on the object 55 and the image analysis unit 83 obtains a residual between the state on the last stage and the target state of the object 55, and then the actuators are driven on the basis of the residual. As a third control method, the image input unit 82 images the objects 55 and the image analysis unit 83 always analyzes the image of the object 55 also on the way of the manipulation therefor, and then the amounts of driving operations for the actuators are sequentially calculated on the basis of the image analysis result. In the second and third methods, since a control is made by tracing the object 55 which moves with time, the object 55 to be traced is designated in advance by the operation input unit 81.

In any one of these methods, like in the first constitution example, the actuator driving-amount calculation unit 85 also calculates the amounts of driving operations for the first to third linear actuators needed to offset the unnecessary positional movement occurring with the operation of the rotary actuator 40 in calculating the amounts of driving operations for the actuators.

Further, though any one of the first to third control methods is applicable, it is desirable to adopt the second or third control method when high-precision control in position and attitude of the object 55 is required. When the same type of operation is repeatedly performed, an operation program may be inputted from the operation input unit 81 to the image analysis unit 83 to automatically perform the operation by the second or third control method.

The control mechanism of FIG. 13 also works as compensation control means for controlling driving operations for the linear actuators which are rectilinear movement means so as to offset the positional movement of the object occurring with the attitude change of the end effector 50 in changing the attitude of the end effector 50 by the rotary actuator 40.

In the control mechanism of the micromanipulator 1 as discussed above, both in the cases of adopting the first and second constitution examples, it is possible to control the driving operation for the end effector 50 with precision since the feed-back control system is achieved. Further, since the above control mechanism works as the compensation control means, it is possible to offset the unnecessary positional movement of the end effector 50 (or the object 55) occurring with the operation of the rotary actuator 40.

<6. Downsizing of Micromanipulator>

The micromanipulator 1 of this preferred embodiment achieves multi-degrees of freedom combining the degrees of freedom in rectilinear movement and those of rotary freedom, and does not need any complicated mechanism and constitution to prevent the operation of each actuator from interfering with the operations of the other actuators since it is so constructed as to put only a necessary operation on the object 55 with an operation combining the operations of the linear actuators and the rotary actuator. Therefore, in this preferred embodiment, the micromanipulator 1 can be constituted of the minimum elements and it is possible to easily reduce the size of the micromanipulator 1 having multi-degrees of freedom to such a degree as to be freely mounted on a stage of a microscope. Thus, the micromanipulator 1 of this preferred embodiment can be installed on a place where it has been conventionally difficult to introduce a micromanipulator because of limits of space and weight and interference with other machines.

Since the micromanipulator 1 can be easily attached to hands of an assembling robot because of its compact and lightweight body, it is applicable to a ultra-precise assembly of fine parts. Further, since the constituents of each mechanism can be downsized, it is advantageous to achieve cost reduction and resources saving of the micromanipulator 1 on the whole and reduce ill effect on the environment at the time of disposal.

Furthermore, though a constitution in which a plurality of linear actuators are sequentially connected in series, and specifically, the second linear actuator 20 is connected to the slider 13 of the first linear actuator 10 and the third linear actuator 30 is connected to the slider 23 of the second linear actuator 20, such as that of the micromanipulator 1 of this preferred embodiment, is generally problematic in terms of difficulty in ensuring precision on mechanism design, deterioration in rigidity of the mechanism on the whole and the like, the above problem is negligible only in terms of the field of a compact micromanipulator.

In terms of ensuring precision, though the respective sliders 13, 23 and 33 of the first to third linear actuators 10 to 30 are required to be highly rectilinear in their movements and less wobble, when these have sizes of 20 mm×20 mm×20 mm in X, Y and Z directions, respectively, it is possible to reduce cost for parts even if the parts are manufactured through high-precision process since a region required to highly ensure planarity of sliding surfaces of the slider and the spline shaft and precision in shape is very small.

In terms of rigidity, since the mass of an object to be manipulated by a micromanipulator or an operation load due to its actual operation is extremely small, important things are rigidity and mass of the micromanipulator itself. The micromanipulator 1 of this preferred embodiment has excellent rigidity, being lightened, with the parts in smaller number and of smaller sizes, since it achieves required degrees of freedom with the minimum constituent elements.

Further, we consider deflections of the spline shafts 12, 22 and 32 of the first to third linear actuators 10 to 30. The amount of deflection δ of the spline shaft due to its flexural rigidity is generally expressed as $$\delta = mWR^3/EI$$

When the size of the whole device is halved, the flexural rigidity EI of the spline shaft (E: Young's modulus of the material for the spline shaft, I: moment of inertia of area of the spline shaft) becomes 1/16. The amount of deflection δ of the spline shaft is proportional to the cube of the length R of the spline shaft. Therefore, assuming that a load W is constant, when the size is halved, the amount of deflection δ of the spline shaft becomes twice. When the size is halved, however, the volume of the whole device including the spline shafts and other actuators connected thereto becomes 1/8, and the mass also becomes 1/8 if the same material is used. Accordingly, since the load W actually becomes 1/8 when the size is halved, the amount of deflection δ becomes 1/4. Therefore, since the micromanipulator 1 of this preferred embodiment have very small constitution, it achieves high-precision manipulation with the less amount of deflection δ of each spline shaft.

Thus, since the micromanipulator 1 has a constitution to easily downsize the whole device, it is possible to ensure cost reduction and effectively ensure precision and rigidity.

<7. Mode Selection>

The above discussion has been made on the micromanipulator 1 which offsets the positional movement of the object occurring with the rotary operation with relatively simple constitution and has the actuators constituted of the minimum elements.

Since the micromanipulator 1 offsets the positional movement of the object occurring with the rotary operation through its driving control, however, it is naturally possible to perform an operation allowing the positional movement of the object if the control is changed.

Therefore, if two control modes, i.e., a first driving control mode to offset the positional movement of the object occurring with the rotary operation and a second driving control mode to drive only the rotary actuator with the rectilinear movement means not driven so as to allow the positional movement of the object, are prepared in the above control mechanism, it is possible to separately perform the operation to compensate the positional movement of the object and the operation not to compensate it.

In this case, when the operator selectively inputs one of the control modes through the operation input unit 81 in operating the micromanipulator 1, the control mechanism performs an operation control on the basis of the selected one of the control modes.

Specifically, the above control mechanism works not only as the compensation control means but also as attitude-only control means to drive the rotary actuator 40 with the rectilinear movement means consisting of the first to third linear actuators 10 to 30 not driven, and determination on which means is activated is made on the basis of the selective input through the operation input unit 81 serving also as activation means.

<8. Variations>

The above discussion has been made on the preferred embodiment of the present invention, but the present invention is not limited to the above discussed one.

For example, in the above discussion, in order to achieve the driving in three-axis directions orthogonal to one another, three linear actuators are connected in sequence orthogonally to one another to constitute the rectilinear movement means. When the micromanipulator 1 is required to have two degrees of freedom in rectilinear movement, however, only two linear actuators have to be connected to each other.

Further, the above discussion has been made to a case where the linear actuators are provided with the spline shafts 12, 22 and 32 as guide shafts for guiding the sliders in predetermined directions, but the present invention is not limited to this case. Specifically, though the convex portion of the spline shaft and the concave portion of the slider are engaged with each other to suppress the rotation of the slider in a circumferential direction of the spline shaft in each of the above linear actuators, the constituent element of the rectilinear movement mechanism is not limited to the spline shaft, only if able to suppress the circumferential rotation of the slider. Therefore, the guide shaft may be made of an element such as a shaft of a prism.

While the invention has been shown and described in detail, the foregoing description is in all aspects illustrative and not restrictive. It is therefore understood that numerous modifications and variations can be devised without departing from the scope of the invention.

What is claimed is:

1. A manipulator, comprising;
   a holding unit for holding an object, said object having a point thereon;
   a rotary member for rotating said holding unit;
   a parallel movement member for parallelly moving said holding unit; and
   a controller for controlling said parallel movement member, in response to a rotation by said rotary member, to move said parallel movement member in a direction opposite to a direction in which said point on said object is moved by said rotation of said holding unit.

2. A manipulator according to claim 1, wherein said parallel movement member includes three actuators movable in three directions orthogonal to one another.

3. A manipulator according to claim 1, further comprising: a sensor for detecting the amount of rotation of the holding unit by said rotary member.

4. A manipulator according to claim 3, wherein said sensor is an optical sensor.

5. A manipulator, comprising:
a holding unit for holding an object, said object having a point thereon;
a rotary member for rotating said holding unit so that the point is moved in a predetermined plane;
a first actuator bolding said rotary member and being movable in a first direction;
a second actuator holding said first actuator and being movable in a second direction orthogonal to said first direction;
a third actuator holding said second actuator and being movable in a third direction orthogonal to both said first direction and said second direction; and
a control unit for driving said first, second and third actuators, in response to a rotation by said rotary member, so as to parallelly move said rotary member in a direction opposite to a direction in which said point on said object is moved by rotation of said holding unit in rotating said holding unit holding said object in said plane by said rotary member.

6. A manipulator according to claim 5, wherein said first actuator comprises a first guide shaft, a first slider movable along said first guide shaft and a first driving source for moving said first slider along said first guide shaft,
said second actuator comprises a second guide shaft, a second slider movable along said second guide shaft and a second driving source for moving said second slider along said second guide shaft, and
said third actuator comprises a third guide shaft, a third slider movable along said third guide shaft and a third driving source for moving said third slider along said third guide shaft.

7. A manipulator according to claim 6, wherein said first actuator is fixed to said second slider, and said second actuator is fixed to said third slider.

8. A manipulator according to claim 6, wherein said first, second and third driving sources are each made of a piezo-electric element.

9. A manipulator according to claim 8, wherein said piezo-electric element is driven by applying a voltage of a predetermined serrate waveform.

10. A method of moving an object utilizing a manipulator, said object having a point thereon, said method comprising the steps of:
rotating a holding unit holding said object so that the point is moved in a predetermined plane; and
driving predetermined actuators to parallelly move said holding unit in a direction opposite to a direction in which the point on said object is moved by manipulation of said holding unit.

11. A manipulator having an end effector for holding an object in a first orientation at a location, said manipulator comprising:

a rectilinear movement member comprising a plurality of linear actuators connected in sequence orthogonally to one another, said rectilinear movement member demonstrating a plurality of degrees of rectilinear movement freedom;
an attitude change member having one portion connected to one of said plurality of linear actuators on a last stage and another portion connected to a base end of said end effector, said attitude change member for changing an attitude of said end effector and thereby providing a positional movement to said object; and
a compensation controller for driving said rectilinear movement member so as to offset the positional movement of said object occurring with an attitude change of said end effector,
wherein said controller drives said rectilinear movement member such that said actuators of said rectilinear movement member move said end effector in a direction opposite to a direction in which a point on said object is moved by an attitude change of said end effector and such that following operation of said attitude change member and said rectilinear movement member, said object is positioned in a second orientation substantially at the location.

12. A manipulator according to claim 11, wherein each of said plurality of linear actuators comprises:
a guide shaft which is a constituent of a rectilinear movement mechanism;
a slider slidable along said guide shaft; and
a driving source for moving said slider along said guide shaft,
wherein said rectilinear movement member has a constitution in which said slider of one of said plurality of linear actuators is connected to one end of the subsequent-stage one of said plurality of linear actuators.

13. A manipulator according to claim 12, wherein said driving sources of said plurality of linear actuators are each made of a piezo-electric element.

14. A manipulator according to claim 13, wherein said piezo-electric element of each of said plurality of linear actuators is connected to an end surface of said guide shaft and drives said guide shaft to perform reciprocating movement at an asymmetrical speed to have said slider perform a relatively inertial movement.

15. A manipulator according to claim 11, further comprising:
an altitude-only controller for driving said attitude change member with said rectilinear movement member not driven; and
a selective activator for selectively activating one of said compensation controller and said attitude-only controller in changing the attitude of said end effector by said attitude change member.

16. A manipulator according to claim 11, wherein said attitude change means is rotatable about three rotary axes orthogonal to one another and changes the attitude of said end effector through rotary operation about said rotary axes.

17. A manipulator for reorienting an object from a first orientation at an initial location to a second orientation substantially at said initial location, said manipulator comprising:
an end effector for holding said object;
an attitude adjustment member for adjusting an attitude of said end effector, said attitude adjustment member comprising a base plate, an attitude adjustment plate, and a plurality of piezo-electric elements positioned between said base plate and said attitude adjustment plate, said plurality of piezo-electric elements driven by applying a voltage of a predetermined waveform;

a rotary member coupled to said base plate of said attitude adjustment member, said rotary member for providing a rotary moment to said end effector and said attitude adjustment member; and at least two actuators for providing rectilinear movement to an end effector, said at least two actuators each comprising a shaft, a slide member slidable on said shaft, and a driving source for moving said slide member on said shaft, said rotary member coupled to a slide member of a first of said at least two actuators, a second of said at least two actuators positioned such that a slide member of said second actuator slides orthogonally to the slide member of said first of said at least two actuators, wherein said at least two actuators operate to counter repositioning of said object which results from reorientation such that after an object has been reoriented from the first orientation at an initial location to the second orientation, a final position of said object is at substantially the initial location.

18. A manipulator, comprising:

a holding unit for holding an object, said object having a point thereon, said object being initially positioned in a first orientation at a location;

a reorientation member for reorienting said holding unit from a first orientation to a second orientation, said reorientation member comprising a rotary member for rotating said holding unit and an attitude adjustment member for adjusting an attitude of said holding unit; and at least one parallel movement member, responsive to a reorientation by said reorientation member, for parallelly moving said holding unit in a direction opposite to a direction in which said point on said object is moved by said reorientation so as to maintain said point in a substantially same location.

19. A method of moving an object utilizing a manipulator, comprising the steps of:

reorienting an object by manipulating a holding unit holding said object so that said object is positionally moved, and driving predetermined actuators to parallelly move said holding unit in a direction opposite to a direction in which a point on said object is moved by manipulation of said holding unit.

20. A manipulator according to claim 1, wherein said rotary member includes an elongate rod which has one end fixed to said parallel movement member and the other end for holding said holding unit, said rotary member rotating about a center line thereof as a rotation axis, and said holding unit is held by said rotary member at a predetermined angle to said rotary member.

21. A manipulator according to claim 1, wherein said rotary member includes an inclined plate having a flat portion for holding said holding unit, and said holding unit is rotated by inclination of said inclined plate.

22. A manipulator comprising:

an operation member for performing operations on an object;

an attitude altering mechanism, coupled either directly or indirectly to said operation member, for altering an attitude of said operation member, wherein an alteration of the attitude causes a positional movement of said operation member;

a relocating mechanism, coupled either directly or indirectly to said operation mechanism, for relocating said operation member without altering the attitude of said operation member; and a controller for controlling said relocation mechanism so as to move said operation member a distance equal in magnitude to and opposite in direction to the positional movement of the operation member.

23. A manipulator, comprising:

a holding unit for holding an object, said object having a point thereon;

a rotary member for both rotating said holding unit and adjusting an attitude of said holding unit;

a parallel movement member for parallelly moving said holding unit in a direction opposite to a direction in which said point of said object is moved when said rotary member moves said holding unit; and a controller for controlling said parallel movement member, in response to a movement of said holding unit caused by said rotary member.

* * * * *